Jan. 2, 1973  F. S. NEWMAN ET AL  3,708,407
PROCESS FOR ANODIZING ALUMINUM AND ITS ALLOYS
Original Filed Sept. 9, 1968  3 Sheets-Sheet 1
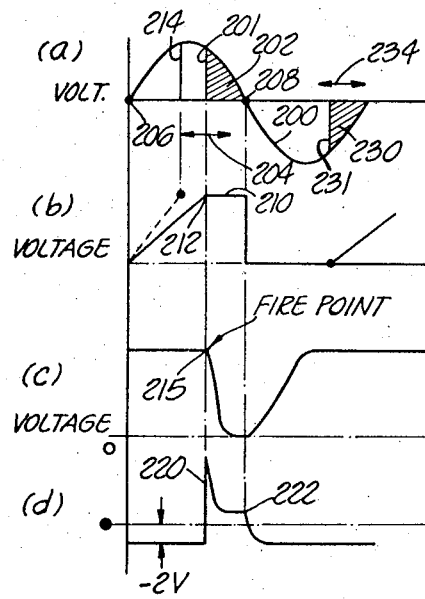
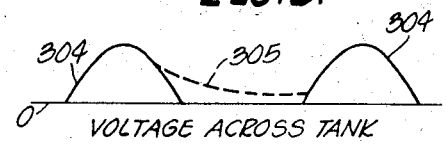
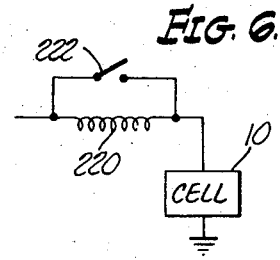
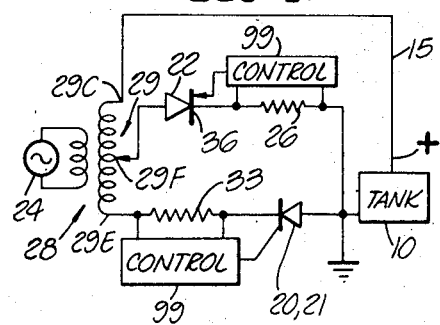
INVENTORS.
FREDERICK S. NEWMAN
JOHN R. THORNE
JOHN T. HARTMAN
BY
Lyon & Lyon
ATTORNEYS United States Patent Office 3,708,407
Patented Jan. 2, 1973

3,708,407
PROCESS FOR ANODIZING ALUMINUM
AND ITS ALLOYS
Frederick S. Newman, Canoga Park, John R. Thorne, Hidden Hills, and John T. Hartman, Reseda, Calif., assignors to The Scionics Corporation, Northridge, Calif.
Original application Sept. 9, 1968, Ser. No. 758,258, now Patent No. 3,597,339. Divided and this application Dec. 23, 1970, Ser. No. 100,926
Int. Cl. B01k 3/00; C23b 9/02, 11/02
U.S. Cl. 204—56
7 Claims

ABSTRACT OF THE DISCLOSURE

An anodizing system uses both positive and negative current pulses. Such pulses are adjustable to achieve different adjusted values of positive and negative currents. These values are sensed and used to maintain automatically such valves. The ratio of negative current to positive current is preferably greater than 3% for the production of relatively thick, dyeable, hard anodized coatings and conventional (normal) anodic coatings of light shades of integral colors using a simple sulfuric acid bath which may be maintained at relatively high temperatures. Current may be applied at nearly full current density initially without burning. In some cases, additional means may be provided to increase the throwing power by eliminating the negative current and using means such as capacitors or inductors to prolong the decay of the positive pulses, preferably such that the then composite positive pulses are maintained above a zero value. These composite positive pulses are maintained in a ratio and wave shape which yields both good "throwing" power and high quality, even coatings, and produces the anodic coatings at relatively high current densities.

The present invention relates to improved means and techniques which are particularly useful in the production of anodized coatings.

The present application is a division application, Ser. No. 758,258, filed Sept. 9, 1968, now U.S. 3,597,339, and assigned to the present assignee.

A specific object of this present invention is to provide a system where the effective current density may be adjusted by adjusting input voltage while the average current density is maintained at a predetermined level.

Another specific object of the present invention is to provide a system of this character which advantageously uses a simple bath mixture, but is not dependent on such simple bath.

Another specific object of the present invention is to provide new means and techniques which advance the hard and conventional anodizing arts.

Another specific object of the present invention is to provide a system of this character in which satisfactory hard and conventional anodizing may be accomplished at higher bath temperatures than now known to the art.

Another specific object of the present invention is to provide new means and techniques having the advantage that hard anodized objects produced thereby are remarkably light colored and receptive to dye stuffs for coloring purposes.

Another specific object of the present invention is to provide new means and techniques that permit the use of high current densities in the bath for greater speed of processing.

Another specific object of the present invention is to provide new means and techniques that permit the application of full, or nearly full, current density at the start of the anodizing cycle without adversely affecting the part being anodized.

Another specific object of the present invention is to provide a system which will simplify the anodizing process enabling operators of lesser skill than now practical to perform the anodizing.

Another specific object of the present invention is to provide a system of this character in which there is less tendency for the parts being anodized to burn thereby allowing the use of higher current densities, shorter processing times, the production of thicker coats and coats of higher dielectric strength, and immediate start up at the desired current levels.

Another specific object of the present invention is to provide an improved system of this character in which the bath may consist only of a solution of water and sulfuric acid, although more complex baths may be used if desired.

Another specific object of this invention is to provide a system which will coat copper bearing alloys, and other hard to anodize alloys, to greater thicknesses in shorter times than heretofore practical without burning or softening the coat.

Another specific object of this invention is to provide a system which will build an anodic coat with improved abrasion resistant qualities.

Another specific object of this invention is to provide a system which contains means of varying operating parameters so that the proper parameters can be selected and automatically achieve and optimize the particular characteristic of the coating most desired.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIG. 1 shows in general form a system embodying features of the present invention.

FIG. 4 illustrates graphically on the same time scale various conditions existing in the system of FIG. 1.

FIG. 5 illustrates a modified wave form used under certain conditions, produced by modification of the apparatus shown in FIG. 2.

FIG. 6 illustrates another modified form used under certain conditions.

Figure 2:
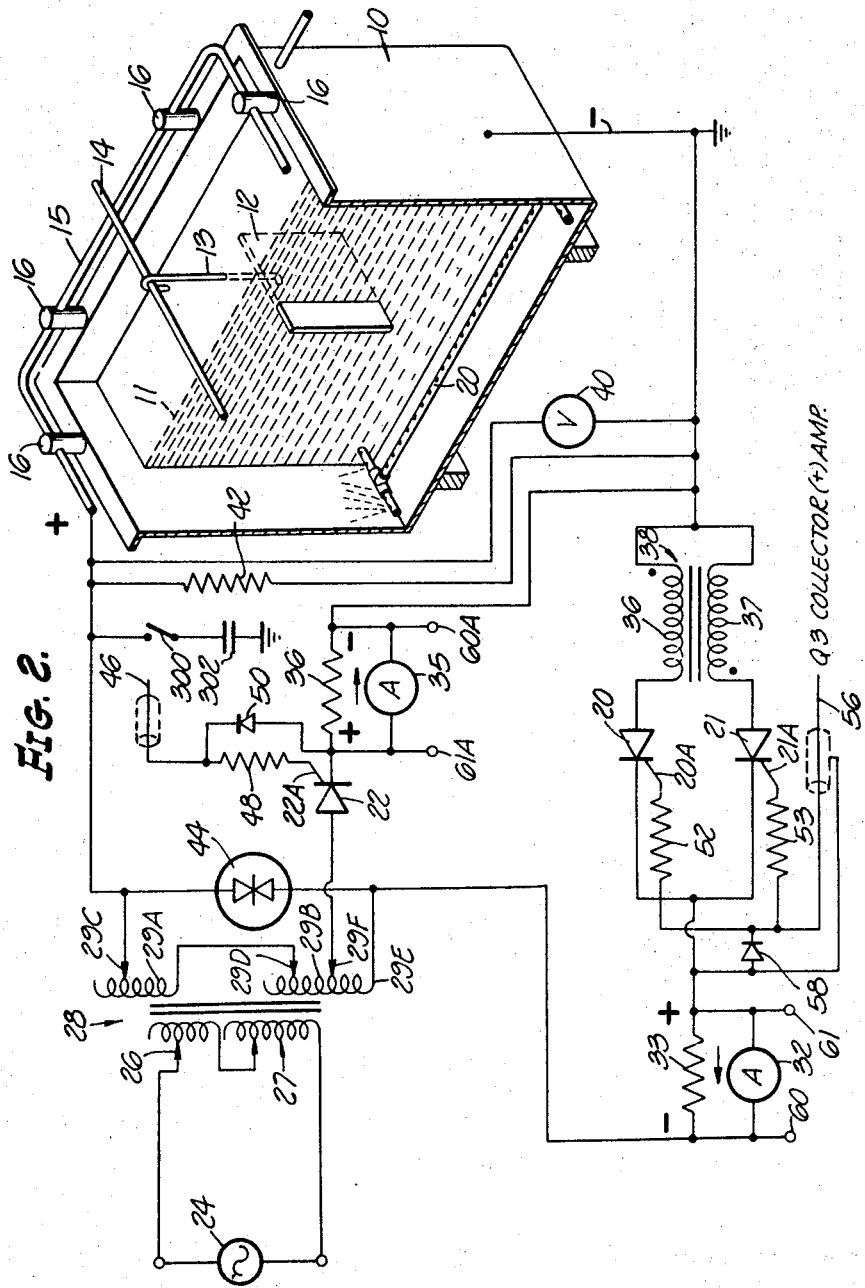
FIG. 2 illustrates in more detail the circuitry for the flow of anodizing tank bath currents.

The system is illustrated generally in FIG. 1 and involves an A.C. source 24 supplying current to an anodizing tank 10 via a transformer 28 having taps 29C, 29F and 29E on its secondary winding 29.

Tap 29C is connected to the positive terminal 15 of the anodizing tank 10 which has its metal container grounded.

Tap 29F is connected to the grounded tank via a series circuit which includes an ammeter shunt resistance 36 and a silicon controlled (SCR) rectifier 22 for the supply of negative current through the tank 10, such negative current being controlled by a control signal applied to the gate electrode of the rectifier 22. Such control signal is developed in the control unit 99 (FIG. 3) in response to the average value of current flowing through resistance 36.

Likewise, tap 29E is connected to the grounded tank via a series circuit which includes an ammeter shunt resistance 36 and a pair of parallel connected silicon controlled recitifiers (SCR) 20, 21 (FIG. 2) for the supply of positive current through the tank 10, such positive current being controlled by a control signal applied to the gate electrode of rectifiers 20, 21 jointly. Such control signal is developed in the control unit 99 (FIG. 3, two of which are provided in the complete system) in response to the average value of positive current flowing through resistor 33.

The anodizing system in FIG. 2 involves a metal tank 10 maintained at ground potential containing a liquid bath 11 within which the part 12 is suspended using a hanger 13 supported on a cross rod 14, the rod 14 being supported on an electrical conductor 15 which in turn is supported on tank 10 using a series of electrical insulators 16. This conductor 15 provides the positive terminal of the cell and a good conductive path for the flow of heavy currents to the part 12 is assured by suitable means using, for example, clamps (not shown) to clamp the elements 14 and 15 together and also to clamp elements 13 and 14 together.

Preferably the bath is agitated using compressed air produced by either a displacement blower, high pressure pump or any other means known to the art which is introduced into the perforated manifold structure 20 so that agitation is achieved by such air bubbling up through the bath which also is refrigerated using conventional refrigations means.

Current in each of the two half cycles of an alternating current wave is controlled using a pair of silicon controlled rectifiers 20, 21 for heavy positive current flow (during the positive half of the A.C. cycle) and one silicon controlled rectfier (SCR) for the smaller negative current flow.

The A.C. is supplied from an A.C. source 24 having one of its terminals connected to the adjustable tap 26 of the primary winding 27 of transformer 28, an outside terminal of winding 27 being connected to the other terminal of source 24. The secondary winding is illustrated as having two series connected sections 29A, 29B with the adjustable tap 29C being connected to the positive cell terminal 15. An adjustable tap 29D on winding 29B is connected to an outside terminal of winding 29A and an outside terminal 29E is connected to the interconnected cathodes of rectifiers 20, 21 through an ammeter 32 shunted by its shunt. An adjustable tap 29F on winding 29B is connected directly to the anode of rectifier 22 which has its cathode connected to the grounded tank 10 through an ammeter 35 shunted by its shunt 36. The anodes of rectifiers 20, 21 are connected to the same ground point through corresponding windings 36, 37 of a paralleling transformer 38 which functions to automatically apportion and equalize and load current between rectifiers 20, 21 in response to any unbalance in such currents. In other words, when the currents are unbalanced a voltage is developed that tends to restore the current balance in devices 20 and 21.

A voltmeter 40 and bleeder resistor 42 may be connected across the positive and negative bus bars.

A surge or transient suppressor 44 in the general form of diodes connected in back-to-back relationship may be connected across terminals 29C, 29E.

The gate electrode 22A of device 22 is connected to the control lead 46 through isolating resistance 48 and such lead 46 is connected to the cathode of device 22 through diode 50 for noise suppression purposes.

Likewise the gate electrodes 20A, 21A are connected through corresponding resistors 52 and 53 to the control lead 56 and a diode 58 is connected between the lead 56 and the interconnected cathodes of devices 20, 21.

Figure 3:
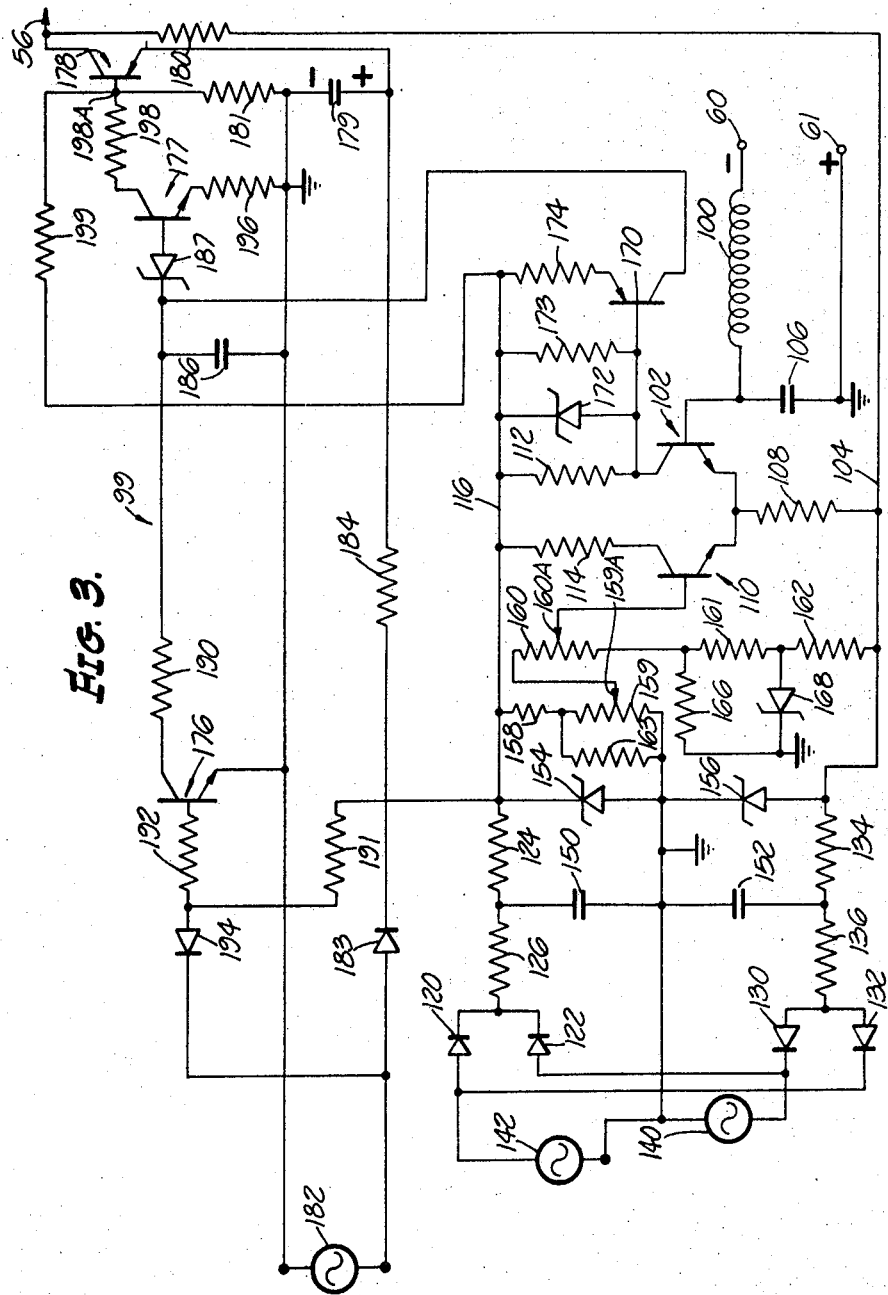
FIG. 3 illustrates in detail the control circuitry indicated at 99 (two places) in FIG. 1.

Suitable signals as now described in connection with FIG. 3 are applied to the control leads 46, 56 which may be the internal conductor of a coaxial cable having its outer sheath maintained at substantially ground potential.

FIG. 3 discloses details of the control for lead 56 (FIGS. 1 and 3) but it will be understood that the following description of FIG. 3 is applicable also to the control for the other control lead 46.

The terminals 60 and 61 in FIGS. 2 and 3 correspond to opposite terminals of the ammeter shunt 33 through which current flows during a selected portion of the positive half wave of current. (Likewise when the lead 46 corresponds to lead 56 in the negative half wave control amplifier then terminals 60, 61 correspond to terminals 60A, 61A which are the terminals of the ammeter shunt 36).

Lead 61 is grounded and lead 60 is connected through a filter choke 100 to the base of transistor 102 having its emitter electrode connected to a minus 20 volt lead through resistor 108. A filter capacitor 106 is connected between such base and ground so that a filtered negative average voltage appears across capacitor 106. Such voltage is proportional to the average current flowing during the positive half cycle, i.e. through the parallel circuit comprising ammeter 32 and 500 ampere, 100 millivolt shunt 33.

This voltage is compared with a reference voltage in the comparator circuit involving transistors 102, 110, each of which has its emitter connected through the common resistor 108 to lead 104 and which has its collector connected through a corresponding resistor 112, 114 to the positive lead 116.

Lead 116 is nominally at plus 20 volts, the same being connected to the interconnected cathodes of rectifiers 120, 122 through the series connected current limiting resistance 124 and resistance 126. Lead 104 is nominally at minus 20 volts, the same being connected to the interconnected anodes of rectifiers 130, 132 through current limiting resistor 134, and resistor 136.

A pair of A.C. sources 140, 142 of substantially the same voltage each one has one of its terminals grounded, the other terminal of source 142 being connected to the anode of device 120 and also to the cathode of device 132. Likewise, the other terminal of source 140 is connected to the cathode of device 130 and also to the anode of device 122.

Filter capacitors 150, 152 each have one of its terminals grounded, the other terminal of capacitor 150 being connected to the junction point of resistances 124, 126 and the other terminal of capacitor 152 being connected to the junction point of resistances 134, 136.

A Zener diode 154 is connected between lead 116 and ground and likewise Zener diode 156 is connected between lead 104 and ground for voltage regulation purposes.

A voltage dividing circuit is connected between leads 116, 104 comprising essentially: resistors 158, 159, 160, 161, and 162 with resistor 163 shunting the outside terminals of resistor 159 to provide a fine voltage control at tap 159A on resistor 159 and a relatively coarse control at the tap 160A on resistor 160. A resistor 166 is connected between the junction point of resistors 160, 161 and ground and a Zener diode 168 is connected between the junction point of resistors 161, 162 and ground.

Resistor tap 160A is connected to the base of transistor 110 which is in a comparator circuit, as previously mentioned, for providing a comparison between, on the one hand, an adjustable voltage established by adjustment of taps 159A, 160A and, on the other hand, an average voltage developed across capacitor 106.

The collector of transistor 102 is connected to the base of transistor 170 and also to one terminal of Zener diode 172 and resistor 173 each having its other terminal connected to positive lead 116. The emitter of transistor 170 is connected to positive lead 116 through resistor 174. The current through transistor 170 is altered for purposes explained later.

By adjustment of the tap 159A resistance 159 the base of transistor 110 may be set within the range of zero plus or minus 100 millivolts, and this may be considered a reference voltage. In the event that the reference voltage is greater than the average voltage developed across capacitor 106 then transistor 110 is turned on and transistor 102 is turned off, i.e. in a nonconductive state. When transistor 102 is turned off its collector voltage rises, i.e. becomes more positive to in turn produce a smaller current flow through transistor 170. This results in a trigger circuit being retarded in such a way that on the next positive half cycle the silicon controlled rectifiers 20, 21 fire later to reduce the current through rectifiers 20, 21 to in turn cause the average voltage across capacitor 106 to increase to the point where the reference voltage no longer exceeds such average voltage.

For these purposes the control circuit involving transistors 176, 177 and 178 is provided. In general, conduction of transistor 178 causes a positive voltage developed on capacitor 179 to be applied through the emitter-collector path of transistor 178 to cause the control lead 56 to become positive and the rectifiers 20 and 21 to become conductive. This lead 56 is normally maintained at a negative potential by its connection through resistor 180 to the negative lead 104. Transistor 178 has its collector connected to control lead 56, its emitter connected to the positive ungrounded terminal of capacitor 179 and its base connected to ground via resistor 181.

Capacitor 179 is connected in series with an A.C. source 182, a diode 183 and resistor 184 so as to acquire this positive charge.

The particular time at which the voltage on the precharged capacitor 179 is applied is in general determined by the condition of capacitor 186.

Capacitor 186 has one of its terminals grounded and the other one of the terminals of this capacitor 186 is connected (a) via diode 187 to the base of transistor 177, (b) to the collector of the previously mentioned transistor in the comparator network and (c) via current limiting resistor 190 to the collector of transistor 176 having its emitter electrode grounded.

The base of transistor 176 is connected to the positive lead 116 via the series connected resistors 191 and 192, such that transistor 176 would continuously conduct, but such conduction if periodically interrupted as a result of the ungrounded terminal of A.C. source 182 being connected via diode 194 to the junction point of resistance 191 and 192. Thus transistor 176 serves as a means for shunting a current from capacitor 186 to ground. When the current flowing in transistor 170 is increased, capacitor 186 acquires in a shorter time a charge sufficient to overcome the Zener value of Zener diode 187 (which establishes a threshold) to turn on transistor 177 which has its base connected to one terminal of diode 187, its emitter connected to ground via resistor 196 and its collector connected to the positive lead 116 via the series connected resistors 198, 199 having their junction 198A point connected to the base of transistor 178. When transistor 177 conducts, transistor 178 thus also conducts causing a trigger derived from the precharged capacitor 179 to be applied to the rectifiers 20, 21 to cause them to conduct. The greater the current of transistor 170, the shorter time it takes for capacitor 186 to achieve the voltage required to cause Zener diode 187 to conduct and hence the shorter is the time before the trigger voltage is applied through transistor 178.

This procedure is graphically illustrated in FIG. 4 where the sine wave 200 represents the voltage between terminals 29C, 29E in FIGS. 1 and 2. In this discussion it will be understood that the A.C. source 182 has a like wave form of the same frequency. The vertical line 201 represents the time during each cycle that the rectifiers 20, 21 are rendered conductive and the shaded area 202 represents the duration of the conduction interval. This line 201 may be adjusted in position as indicated by the double arrows 204 by adjustment of the resistance tap 160A (FIG. 3) to correspondingly increase or decrease the shaded area which represents also the average current flow during the positive half of the A.C. cycle and which is monitored by the ammeter-shunt combination 32, 33 in FIG. 2. Transistor 176 is turned off, in time, at the point 206 when the effect of the D.C. voltage applied through resistance 194 (FIG. 3) is overcome when diode 194 conducts. Transistor 176 is subsequently rendered conductive at point 208 when diode 194 is in a nonconductive state. In the meantime, transistors 177 and 178 are rendered conductive at the time represented by line 201.

FIG. 4(b) represents the corresponding variation in voltage across capacitor 186. When and as such voltage builds up in intensity and reaches the value represented by the horizontal line 210 (which represents the threshold voltage established by Zener diode 187) transistor 177 is turned on at point 212. This point 212 may be adjusted in time by adjustment of the resistance tap 160A to, for example, the point 213 in which case the line 201 now assumes the position of line 214.

Correspondingly the voltage across capacitor 179 is represented in FIG. 4(c) and it will be seen that such capacitor is precharged and starts discharging at the firing point 215, and again becomes fully charged prior to the next firing time.

FIG. 4(d) correspondingly represents the voltage developed on the gate electrode of rectifiers 20, 21 with respect to their cathodes. It will be seen that at the firing point 220 the voltage rises from a previous sustained negative value to a positive value and such voltage remains positive until point 222 is reached, point 222 corresponding in time to the point 208 where the supply voltage wave 200 changes from a positive value to a negative value.

It will be appreciated that FIG. 4 is useful also as an explanation of conditions associated with the negative current rectifier 22 which establishes current flow during the interval indicated by the shaded area 230 in FIG. 4. The line 231 defining a boundary of such area 230 corresponds to the time of firing of the negative rectifier and the same may be controlled using a like control 160A in that control unit 99 associated with the negative current rectifier.

It will also be seen that by delaying or advancing the point of firing the line 231 may be shifted as indicated by the double arrow 234 to correspondingly increase or decrease the average value of negative current. The term average current in this context takes into account the fact that during a substantial portion of the negative half cycle there is no negative current flow.

New and improved results are achieved when the ratio of average negative to positive current is 3% or greater, and thus preferably the apparatus previously described is so adjusted. Satisfactory operation and the production of these new results have been observed when such ratio is as high as 20%. Thus, for example, when such ratio is 3% and greater the thickness of the anodized coating may be as much as 12 mils (0.012") or more and the production of a particular thickness is predictable in terms of particular values of current flowing during particular time intervals. Further such hard coating is relatively light in color and has a great capability of absorbing dyes for permanent coloring purposes, even when coated at low temperatures as low as 15° F.; and the process also produces excellent hard coats at 40 amps per square foot even at conventional anodizing temperatures of seventy degrees Fahrenheit. Indeed satisfactory hard coats have been produced using current densities as high as 160 amperes per square foot of the part being anodized with a bath temperature of 20 degrees Fahrenheit.

Such hard coatings and also conventional coatings may be accomplished in a simple aqueous solution of sulfuric acid solution using higher current densities than 40 amperes per square foot with the bath maintained at such relatively high bath temperatures that refrigeration requirements are minimized, yet with the production of thick coatings in a relatively short time interval. Such coatings may be produced in aqueous solutions where the sulfuric acid is as low as 5% and as high as 25% by volume, but we prefer to maintain the bath at 10%. Conventional anodizing can be achieved in a fraction of the usual time without impairing the quality of the coating.

Alloy 2024 and other alloys in the 2XXX series where copper content may exceed 4.5% as well as 6061 aluminum alloy which is a magnesium braced alloy. Alloys possessing large amounts of silicon (7% or greater) including diecast alloys such as 13X and 380 with silicon contents up to 13% may also be processed.

Using percentages greater than 3% the relationship between thickness of the anodized coating developed and time is a substantially linear one, i.e. the thickness produced is accurately predictable. The time required for a particular thickness is relatively small and also the coating produced has exceptionally good dielectric strength.

In those instances where it is desired to enhance the throwing power, i.e. the capability of achieving anodized coatings in shadow areas and in cavities the apparatus shown in FIG. 2 may be converted to produce the wave form involving the positive half waves 304 illustrated in FIG. 5 where it will be seen that the negative pulses are eliminated and that the positive pulses are prolonged, using capacitor means 302 (FIG. 2) such that the positive current never reaches zero or never stays at a zero value for an appreciable time interval, measured in terms of the periodicity of the A.C. wave.

This conversion may be accomplished by deactivating the negative current rectifier 20 such that it never conducts and this may be accomplished, for example, by adjustment of the tap 160A (FIG. 3) on that control unit 99 associated with the negative current such that rectifier 20 is prevented from firing. Also switch 300 in FIG. 2 is closed to connect the large capacitor 302 between the positive terminal 15 and grounded terminal 10 of the cell, the capacitor 302 being of sufficient magnitude to sufficiently prolong the positive half waves 304 to obtain the result described above and indicated in FIG. 5 wherein the dotted line 305 illustrates the desired result of the capacitor 302.

It will be appreciated that other means than the capacitor means 302 in FIG. 2 may be used to prolong the positive pulses such that the positive current never reaches zero or never stays at a zero value for an appreciable time interval. Such other means may involve an inductor connected in series with the anodizing tank 10. Such a modification is illustrated in FIG. 6 wherein the anodizing tank 10 is connected in series with an inductor 220, such inductor 220 being connected in parallel with a switch 222 which in its closed position short-circuits the inductor to render the same ineffective. Switch 222 in its closed position has essentially the same effect as that produced when switch 300 in FIG. 2 is in its open position.

It will be appreciated that the invention is applicable not only to the use of single phase currents but also to multiphase currents such as two-phase and three-phase currents. Using such multiphase currents the throwing power may be increased if desired by inserting inductance in series with the anodoizing tank as exemplified in FIG. 6 or by inserting capacitance in parallel with the tank 10 as exemplified in FIG. 2. The same is generally true with respect to whether the rectification is of the full-wave type or of the half-wave type.

It will be further appreciated that the broader aspects of the present invention are not dependent on the particular shape of the current wave since the same may be of sine wave character, square wave character, or predominantly sharp peaks.

It will be appreciated that aspects of the present invention are applicable to so-called conventional anodizing, i.e. anodizing accomplished at temperature above approximately 65° Fahrenheit to produce so-called clear but dyeable thin coatings of thickness of from .2 mil to .4 mil (.0002" to .0004") as well as to hard anodic coatings of appreciably larger thicknesses.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

I claim:

1. In an anodizing system in which a current is passed through an anodizing bath in the process of anodizing a cavity portion of aluminum or a like anodizable material, the steps comprising applying a rectified half wave pulse derived from an alternating current source to said bath and modifying such that the duration of said current, all of the same polarity lasts for a time greater than the duration of one half cycle of said alternating current.

2. In an anodizing system in the process of anodizing aluminum or a like anodizable material wherein a current is caused to flow through an anodizing bath, the steps comprising deriving a current of positive polarity from one half wave of an alternating current source and applying such current to such bath, and prolonging the flow of said current such that said current flows during a time interval coextensive with a half wave of said alternating current which succeeds that half wave from which said current is derived without said flow of current assuming a zero value.

3. In an anodizing system in the process of anodizing a cavity portion of aluminum or like anodizable material wherein a current of positive polarity is derived from an alternating current voltage source and is caused to flow through an anodizing bath, the steps comprising using only the positive half cycle of said alternating current to produce a pulse and then prolonging the pulse for a time interval such that the total length of the prolonged pulse is greater than one half cycle of said alternating current and applying said prolonged pulse to said anodizing bath.

4. A system as set forth in claim 3 in which said prolonged pulse is prolonged such that it never reaches a zero value.

5. In an anodizing system in the process of anodizing a cavity of aluminum or like anodizable material wherein a current is derived from an alternating current voltage source and is caused to flow through an anodizing bath, the steps comprising deriving from one half cycle of said alternating current a pulse which has a sharper rise than the rise of the alternating current half wave from which said pulse is derived, and then prolonging said pulse such that a prolonged pulse is developed which has a duration longer than the duration of the half wave from which it is derived, and applying said prolonged pulse to said anodizing bath.

6. A system as set forth in claim 5 in which said pulse decays at a slower rate than the decay rate of the alternating current half wave from which it is derived.

7. A system as set forth in claim 6 in which said prolonged pulse never reaches a zero value.

References Cited

FOREIGN PATENTS

| | | | |
|---|---|---|---|
| 654,299 | 12/1962 | Canada | 204—58 |
| 548,071 | 10/1957 | Canada | 204—58 |

JOHN H. MACK, Primary Examiner

R. L. ANDREWS, Assistant Examiner

U.S. Cl. X.R.

204—58, 228